US009424356B2

(12) United States Patent
Sun et al.

(10) Patent No.: US 9,424,356 B2
(45) Date of Patent: Aug. 23, 2016

(54) UPDATING A SEARCH INDEX USING REPORTED BROWSER HISTORY DATA

(75) Inventors: Walter Sun, Bellevue, WA (US); Junaid Ahmed, Redmond, WA (US); Yipeng Li, Redmond, WA (US); Peter Bailey, Kirkland, WA (US); Nikhil Dandekar, Bellevue, WA (US); Sasi Parthasarathy, Seattle, WA (US); Xin Chen, Redmond, WA (US); Xiao Zhang, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 383 days.

(21) Appl. No.: 12/964,092

(22) Filed: Dec. 9, 2010

(65) Prior Publication Data

US 2012/0150831 A1    Jun. 14, 2012

(51) Int. Cl.
*G06F 17/30* (2006.01)
(52) U.S. Cl.
CPC .... *G06F 17/30867* (2013.01); *G06F 17/30613* (2013.01); *G06F 17/30876* (2013.01)
(58) Field of Classification Search
None
See application file for complete search history.

(56) References Cited

U.S. PATENT DOCUMENTS

| | | | |
|---|---|---|---|
| 6,625,589 B1* | 9/2003 | Varma et al. | 706/45 |
| 6,718,365 B1 | 4/2004 | Dutta | |
| 7,231,405 B2 | 6/2007 | Xia | |
| 7,725,422 B2 | 5/2010 | Ryan et al. | |
| 7,779,001 B2 | 8/2010 | Zeng et al. | |
| 8,073,850 B1 | 12/2011 | Hubbard et al. | |
| 8,494,897 B1* | 7/2013 | Dawson | 705/7.33 |
| 2006/0173985 A1 | 8/2006 | Moore | |
| 2007/0244857 A1* | 10/2007 | Yu | 707/3 |
| 2007/0245020 A1 | 10/2007 | Ott | |
| 2008/0270404 A1* | 10/2008 | Borkovsky et al. | 707/7 |
| 2009/0282000 A1* | 11/2009 | Bennett | 707/3 |
| 2010/0205168 A1 | 8/2010 | Yang et al. | |
| 2010/0325107 A1* | 12/2010 | Kenton et al. | 707/723 |
| 2011/0119126 A1* | 5/2011 | Park et al. | 705/14.45 |
| 2012/0271941 A1* | 10/2012 | Mirandette | H04L 67/22 709/224 |

OTHER PUBLICATIONS

Accessibility of information on the web—Published Date: 2000 http://www.cse.ust.hk/zsearch/qualify/DistributedSearch/ acessibility%20of%20information%20on%20the%20web.pdf.
SWSE Answers Before Links!—Published Date: 2007 http://vmserver14.nuigalway.ie/xmlui/bitstream/handle/10379/531/paper18.pdf?sequence=1.

(Continued)

*Primary Examiner* — Miranda Huang
(74) *Attorney, Agent, or Firm* — Dave Ream; Tom Wong; Micky Minhas

(57) ABSTRACT

Methods, systems, and computer-readable media are provided for updating a search index with new uniform resource locators (URLs) and spiking URLs with increased user interest. History data, provided from browser applications residing on users' computers that indicate URLs accessed by the users, is parsed to identify new/previously unknown URLs. The history data also indicates URLs in which there is increased interest based on a number of recent hits as compared to an average number of hits determined over time. Author postings of new URLs to social networking sites and a quality rating of the authors may also be used to identify and filter new URLs. Search indexes are updated with the new and spiking URL data. As such, lag time between posting of new URLs and spiking of URL interest and inclusion of this data in a search index is greatly decreased.

13 Claims, 8 Drawing Sheets

(56) References Cited

OTHER PUBLICATIONS

ParaSite: Mining Structural Information on the Web—Published Date: 1997 http://people.mills.edu/spertus/Papers/parasite97.pdf.
The Web Beyond Popularity—Published Date: 2006 http://www2006.org/programme/files/pdf/29.pdf.
Kumar, "An Effective Method for Ranking of Changed Web Pages in Incremental Crawler," In International Journal of Computer Applications, vol. 8, Issue 7, Oct. 2010, 4 pages.
Chi, "Information Seeking with Social Signals: Anatomy of a Social Tag-based Exploratory Search Browser," In Intelligent User Interfaces Conference Workshop on Social Recommender Systems, Hong Kong, China, Feb. 7-10, 2010, 8 pages.
Sullivan, "Bing, Now With Extra Facebook: See What Your Friends Like & People Search Results," Retrieved on: Apr. 25, 2011, Available at: http://searchengineland.com/bing-now-with-extra-facebook-see-what-your-friends-like-52848, pp. 1-20.
Sullivan, "What Social Signals Do Google & Bing Really Count?," Retrieved on: Apr. 25, 2011, Available at: http://searchengineland.com/what-social-signals-do-google-bing-really-count-55389, pp. 1-15.
Stamoulis, "Social Media Signals and What it Means for SEO," Retrieved on: Apr. 25, 2011, Available at: http://www.searchenginejournal.com/social-media-signals-and-what-it-means-for-seo/28730/, 10 pp.
Cutts, "Social Signals, Author Authority, Ranking Factors & Google Realtime," Retrieved on: Apr. 25, 2011, Available at: http://blog.searchenginewatch.com/101222-114000, pp. 1-11.
Kline, "Social Signals and Search at SMX West," Retrieved on: Apr. 25, 2011, Available at: http://community.microsoftadvertising.com/blogs/advertiser/archive/2011/03/08/social-signals-amp-search.aspx, 8 pp.
Non-Final Office Action, mailed Oct. 23, 2013, in U.S. Appl. No. 13/196,008, 32 pp.
Final Office Action, mailed Mar. 14, 2014, in U.S. Appl. No. 13/196,008, 21 pp.
Non-Final Office Action dated Jul. 8, 2015 in U.S. Appl. No. 13/196,008, 15 pages.

\* cited by examiner

UPDATING A SEARCH INDEX USING REPORTED BROWSER HISTORY DATA

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In an embodiment of the invention, a user's computing device includes a browser application for accessing network content. The browser application tracks the uniform resource locators (URLs) accessed via the computing device and generates a history file that includes indications of the URLs. The history file is periodically provided to a search index update server. The server parses the history files provided by a plurality of users to identify new URLs that were previously unknown to the update server. The server also identifies spiking URLs that include URLs that show a recent increase in user interest as compared to an average of user interest over a predetermined period of time. Additional data may be obtained from social networking site servers that indicate URLs posted by authors on social networking websites. New and spiking URLs are identified from this additional data and are filtered based on a quality rating of the associated authors. A score is calculated for each of the identified new and spiking URLs and the URLs are added to a search index based on the score.

DESCRIPTION OF THE DRAWINGS

Illustrative embodiments of the invention are described in detail below with reference to the attached drawing figures, and wherein.

DETAILED DESCRIPTION

Figure 1:
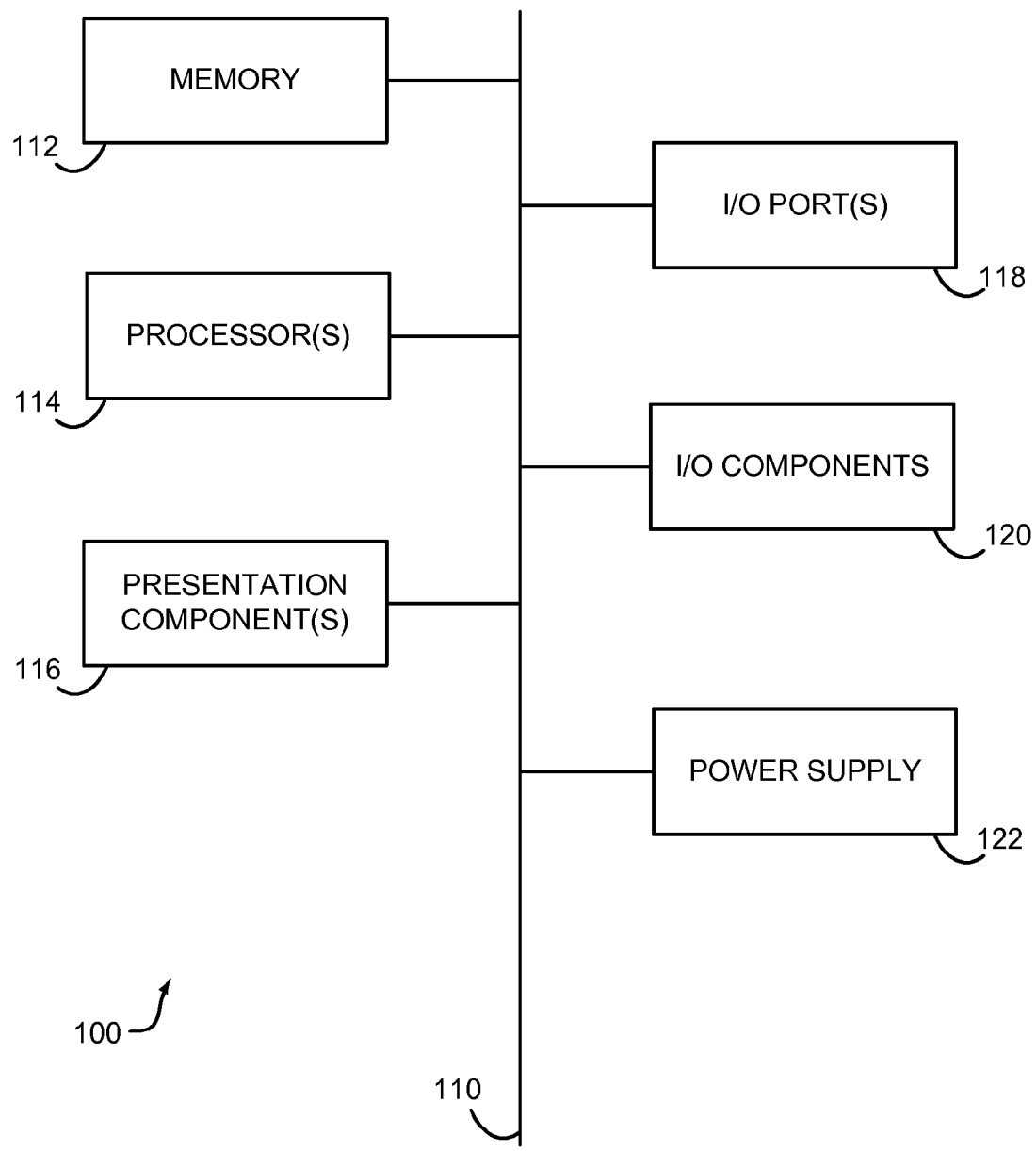
FIG. 1 is a block diagram depicting an exemplary computing device suitable for use in an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Known methods for updating search indexes with newly published documents employ obtaining or receiving data from known domains such as by a really simple syndication (RSS) feed. The data provides indications of the newly added documents on the domain. This method is slow in that it relies on the domain to publish the data which may take anywhere from a few minutes to days, weeks, or longer depending on the domain's activity. Additionally, obtaining such data requires knowledge that the domain exists; if the domain is unknown then no RSS feeds are tracked originating from such domain and there is no direct motive to discover the domain or updates published thereto. Additionally, known URLs and published documents might be parsed to identify URLs located therein and those identified URLs parsed to identify new or previously unknown URLs. This method can be very cumbersome due, at least, to the sheer size of the Internet and the number of documents that must be evaluated to identify new URLs.

Embodiments of the invention include methods, systems, and computer-readable media for updating a search index to include newly identified or newly published uniform resource locators (URLs) and to include indications of URLs that have increased user interest. In an embodiment of the invention, a computer-implemented method for updating a search index to identify documents with spiking interest is described. A history file is periodically received by a first computing device from each of a plurality of second computing devices. The history file includes a URL that has been accessed via a respective second computing device. A number of instances of the URL in the history files occurring in a predetermined time period is determined. An average number of instances of the URL in the history files occurring in the predetermined time period over a predetermined number of days is also determined. The number of instances of the URL is compared to the average number of instances of the URL over the predetermined number of days. The URL is identified as a spiking URL when the number of instances of the URL is at least a predetermined amount greater than the average number of instances of the URL occurring over the predetermined number of days. A search index is updated to indicate the spiking URL.

The search index is usable by a search engine to identify search results for a search query. The search index provides a candidate search query results and associated metadata in any desired data structure that is usable by the search engine. Such data structures might include an inverted index, a flat index, and the like.

An inverted index provides a mapping depicting the locations of content in a data structure. For example, when searching a document for a particular word, the word is found in the inverted index which identifies the location of the word in the document, rather than searching the document to find locations of the word.

In another embodiment, computer-readable media having computer-executable instructions embodied thereon that, when executed, perform a method for updating a search index with newly published documents is described. An application is provided to a first computing device. The application is configured to generate a history file that includes an indication of URLs accessed by a browser application executing on the first computing device. The application and the browser application are the same or different. The history file is received at a second computing device. A new URL is identified from the URLs indicated in the history file. The new URL is associated with a document that was previously unknown to the second computing device. A search index is updated with the new URL. The search index is usable by a search engine to identify search results for a search query.

In another embodiment, computer-readable media having computer-executable instructions embodied thereon that, when executed, perform a method for updating a search index with new and spiking URLs is described. A history file is periodically received at a first computing device from each of a plurality of second computing devices. The history file includes URLs that have been accessed via a respective second computing device. A first new URL is identified from the history files. The first new URL is associated with a document that was previously unknown to the first computing device. A number of instances of a second URL of the URLs included in the history files and within a predetermined time period is determined. The first new URL and the second URL are the same or different. An average number of instances of the second URL in the predetermined time period over a predetermined number of days is also determined. The number of instances of the second URL is compared to the average number of instances of the second URL over the predetermined number of days. The second URL is identified as a spiking URL when the number of instances of the second URL is at least a predetermined amount greater than the average number of instances of the second URL over the predetermined number of days. A search index is updated with the first new URL and to indicate the spiking URL. The search index is usable by a search engine to identify search results for a search query.

Referring initially to FIG. 1 in particular, an exemplary operating environment for implementing embodiments of the invention is shown and designated generally as a computing device 100. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, one or more input/output ports 118, one or more input/output components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device 100 that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media are non-transitory media and are mutually exclusive of transitory communication media, e.g. carrier waves, and the like. By way of example, and not limitation, computer-readable media may comprises Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical or holographic media; magnetic cassettes, magnetic tape, magnetic disk storage or other magnetic storage devices, or any other medium that can be used to encode desired information and be accessed by computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
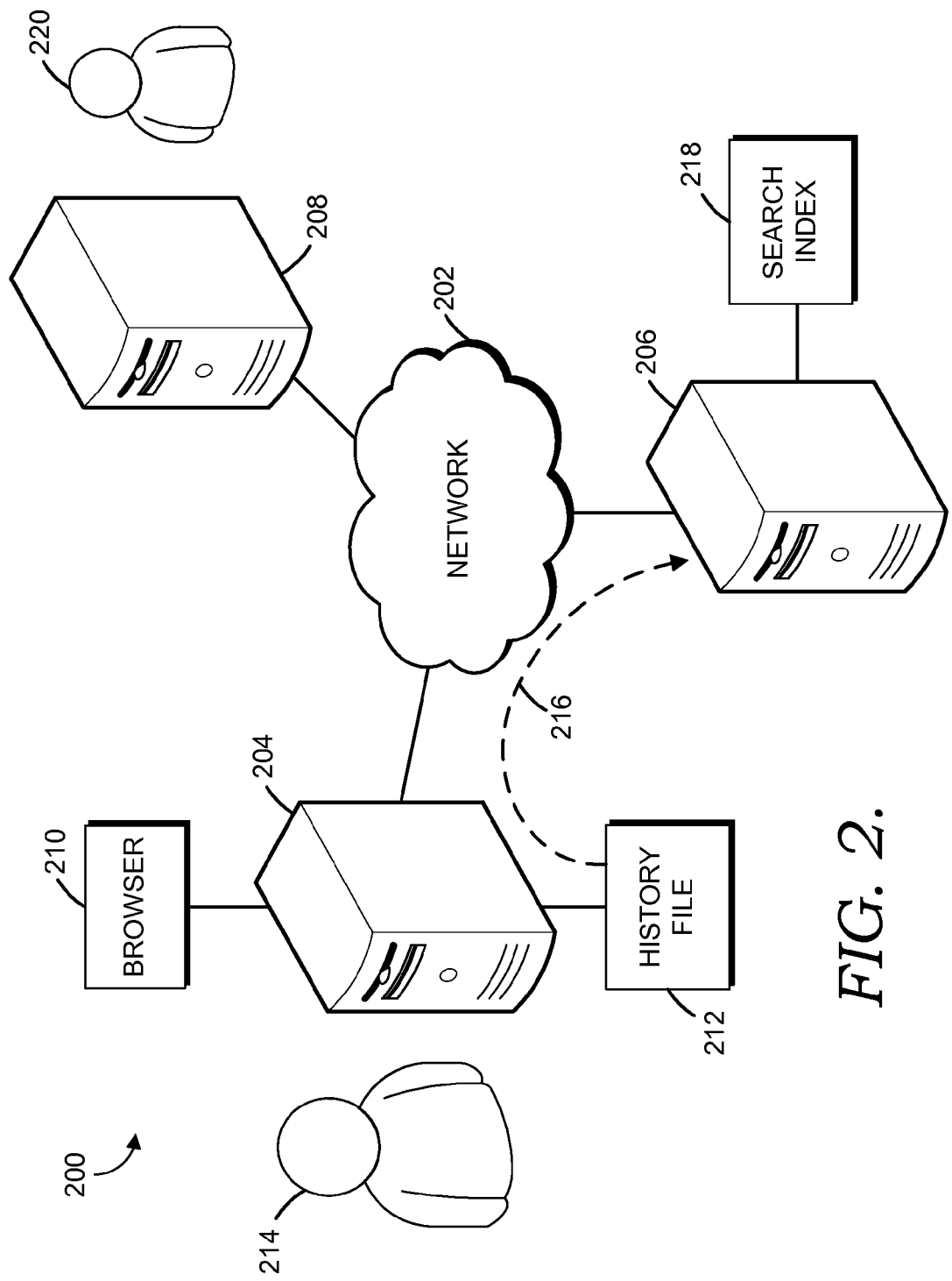
FIG. 2 is a block diagram depicting an exemplary operating environment suitable for use in an embodiment of the invention.

Referring now to FIG. 2, a block diagram of an exemplary network environment suitable for use in implementing embodiments of the invention is generally designated as numeral 200. The network environment 200 depicted in FIG. 2 is only one exemplary environment, of which there may be many, suitable for implementing embodiments of the invention. Further, the components depicted in FIG. 2 are depicted singularly for clarity and are provided with names for reference, but one of ordinary skill in the art will recognize that a plurality of similar components may be used in application and that the nomenclature for the components may change without distracting from the functions described herein with respect to implementation of embodiments of the invention. For example, millions of computing devices might be accessing or connected to a network. Further, the nomenclature applied to a particular component in the environment 200 may change with respect to functions being performed thereby.

The environment 200 includes a network 202, user's computing device 204, a search index update server 206, and a social network server 208. The network is any available computing or communications network such as, for example, and not limitation, the Internet, an intranet, a local area network (LAN), a wireless access network (WAN), and combinations thereof. The user's computing device 204, the search index update server 206 (server 206), and the social network server 208 comprise any one or more computing devices, such as the computing device 100 described above. Each of the devices 204, 206, 208 is configured to access the network 202 and to communicate/receive data from other computing devices via the network 202 as is known in the art. Further detail of the devices 204, 206, and 208 in addition to that provided below, is not necessary for understanding and describing embodiments of the invention and, as such, is not provided herein.

The user's device 204 includes a browser application 210 (also referred to herein as a browser 210). The browser 210 is any browser application now known or later developed that is configurable to access documents via the network 202 such as web pages, web sites, domains, folders, files, and the like. In an embodiment, the browser 210 comprises Internet Explorer® from Microsoft Corporation of Redmond, Wash., U.S.A., or Firefox® from Mozilla Corporation of Mountain View, Calif., U.S.A., among others.

The documents are accessed by the browser 210 using an address or locator such as a web address, uniform resource locator (URL), uniform resource identifier (URI), internet protocol (IP) address, or another indication of the documents or their location in the network. The address or location of documents on the network is referred to herein as a URL, however, such is not intended to limit embodiments of the invention to use of URL specifically; any indicator of document location is usable in embodiments of the invention.

The browser 210 is configured to track an indication of URLs that are accessed by the browser 210. In an embodiment, another application, such as a plug-in or an add-on application is provided to track indications of the URLs or to aid the browser 210 in doing so. The browser 210 may also record any other desired metadata regarding the URLs, characteristics of their associated documents, browsing details, and the like as desired. Indications of the URLs and any associated metadata are stored in a memory at the user's computing device 204 or at another location. The indications are stored as a list, table, or other data structure in a history file 212. The history file 212 is updated each time a user 214 accesses a document via the browser 210 or might be periodically updated upon the occurrence of a period of time or of an identified event, e.g. closing of the browser application 210. In an embodiment, each URL indication is stored as a separate, individual history file 212.

The browser 210 is also configured to communicate the history file 212 to the search index update server 206 via the network 202, as described more fully below and as indicated at 216. In an embodiment, the browser 210 employs a plug-in or add-on application to communicate the history file 212.

With continued reference to FIG. 2, the search index update server 206 is configured to receive the history file 212 from the browser 210. The server 206 includes a search index 218 that is employed by one or more search engines to identify search results for search queries submitted thereto. The search index 218 may be stored in a memory at the server 206 or may be remotely accessible by the sever 206.

In an embodiment, the search index 218 includes a general index and a fresh index. The general index is any search index employed by a search engine to identify search results. In an embodiment, the general index is the main or full search index used by the search engine. The fresh index is also any search index used by the search engine to identify search results, however, the fresh index is much smaller in size and may use the same or different data structure as the general index to provide ease of access and updating.

The fresh index is updated more frequently than the general index and is used to update the general index. For example, the fresh index might be updated every thirty minutes while the general index is only updated every twenty-four hours. Further, the general index is updated by incorporating the data in the fresh index into the general index. In an embodiment, upon updating the general index, the fresh index is cleared and integration of data therein begins anew. As such, the processing required to process updates to the larger general index is confined to fewer instances while the smaller fresh index is more easily updated at much more frequent intervals without consuming a great deal of processing power.

The server 206 is further configured to parse the history file 212 to identify URLs that are new and URLs that indicate spiking user interest. New URLs include URLs that were unknown to the server 206 prior to parsing the history file 212 or that are not included in the search index 218. For example, a new document might be posted to a website; a URL linking to the new document would be a new URL because it would not be known by the server 206 or included in the search index 218.

A URL that indicates spiking user interest, a spiking URL, is a new URL or a known URL. Spiking URLs are identified based on an increase in the number of occurrences or hits for the URL in the history files 212 provided by a plurality of users 214. For example, a known URL that typically has 100,000 hits per day but that exhibits 500,000 hits for a current day might be identified as a spiking URL. Such a situation might occur, for example, when a retailer introduces a new highly sought after product that is available via their website, or when a news organization posts a story on a respective website regarding a high-interest, breaking-news story.

The social network server 208 is any computing device of a social network service that is configured to provide data regarding posts of authors on the social network service. A social network service is an online service, platform, or web site that focuses on building and reflecting social networks or social relations among people. The social network service allows users to exchange and/or publish posts, comments, blog entries, instant messages, emails, and the like via an online, web-based service or website. The social network service might comprise, for example, and not limitation, FACEBOOK of Palo Alto, Calif., MYSPACE of Santa Monica, Calif., or TWITTER of San Francisco, Calif.

The data provided by the social network server 208 includes at least an indication of an author 220 of the data and a URL posted by the author 220. The indication of the author 220 may comprise or include an identification of a web page dedicated to the author 220, such as a blog page or "wall" as is known to users of FACEBOOK within the social network service with which the data can be associated. The indication of the author 220 may be configured in a manner that conceals the true identity of the author 220. The URL posted by the author 220 includes URLs listed on the web page dedicated to the author 220 and URLs within text of the author's posts on her own dedicated web page. The posted URLs might also include URLs posted by the author on web pages dedicated to other users of the social network service, emails, instant messages, and the like. The data is provided via any available means including a really simple syndication (RSS) feed, access to a database at the social network server 208, or another listing of posts to the social network service and/or associated metadata.

Figure 3:
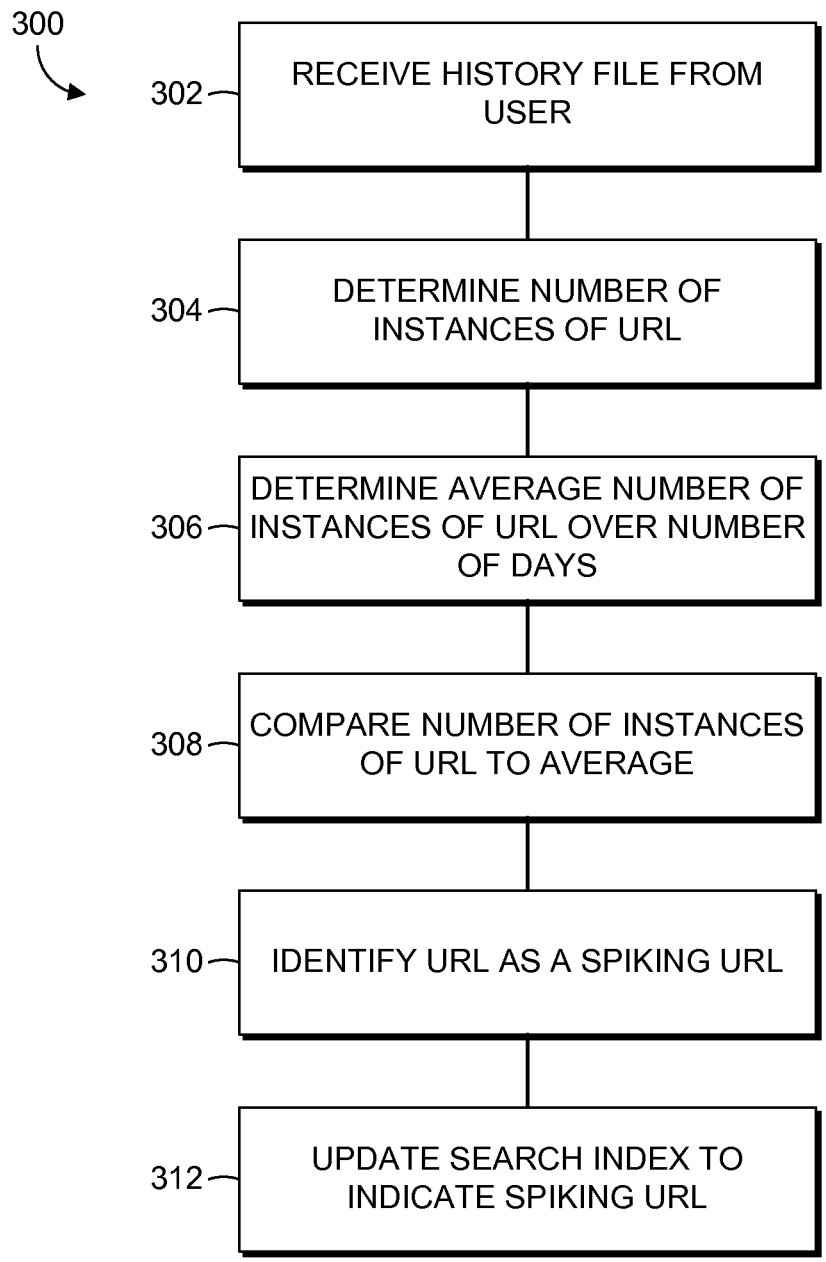
FIG. 3 is a flow diagram depicting a method for updating a search index to identify documents with spiking interest in accordance with an embodiment of the invention.

With reference now to FIG. 3, a method 300 for updating a search index to identify documents with spiking interest in accordance with an embodiment of the invention is described. At a step 302, a history file, e.g. the history file 212, is received at a search index update server from a user's computing device, such as the server 206 and the computing device 204 described above. In an embodiment, the history file is communicated to the server on a periodic scheduled basis or might be communicated at any desired time or interval thereof. In an embodiment, the history file is communicated every six hours. The history file might be compressed and/or encrypted prior to communicating it to the server.

Upon communicating the history file to the server a browser application may delete the history file, remove the contents thereof, or archive the history file in a memory. As such, indications of URLs that are accessed after the history file has been communicated to the server are stored in a new history file. Thus, instances of the stored URLs are not repeatedly communicated to the server unless they are accessed by a user both before and after the history file is communicated to the server.

In embodiments of the invention, a plurality of history files is received from an equal plurality of users' computing devices. For example, a history file might be received from every computing device executing the browser application. In an embodiment, a user is provided with an option to allow the browser to track the URLs accessed by the browser and to communicate the history file to the search index update server; history files are only received from computing devices that have been authorized by a respective user to track the URLs and report the history file. In an embodiment, the communication of the history file is anonymous, e.g. the user cannot be, or is not identified with the history file.

In another embodiment, each user's computing device of the plurality of user's computing devices reporting history files is assigned a scheduled time to communicate the history file to the search index update server. The scheduled times are set in any desired manner and may aid to spread out the reporting of the history files by the user's computing devices over time so as not to overload the search index update server. In an embodiment, the user's computing devices are each scheduled to report the history files in six-hour intervals and the plurality of user's computing devices are divided into a plurality of groups, each group having a different designated time to report their history files. For example, history files might be received from a group A at 12:00 AM, 6:00 AM, 12:00 PM, and 6:00 PM each day, while history files are received from a group B at 12:30 AM, 6:30 AM, 12:30 PM, and 6:30 PM each day.

Figure 4:
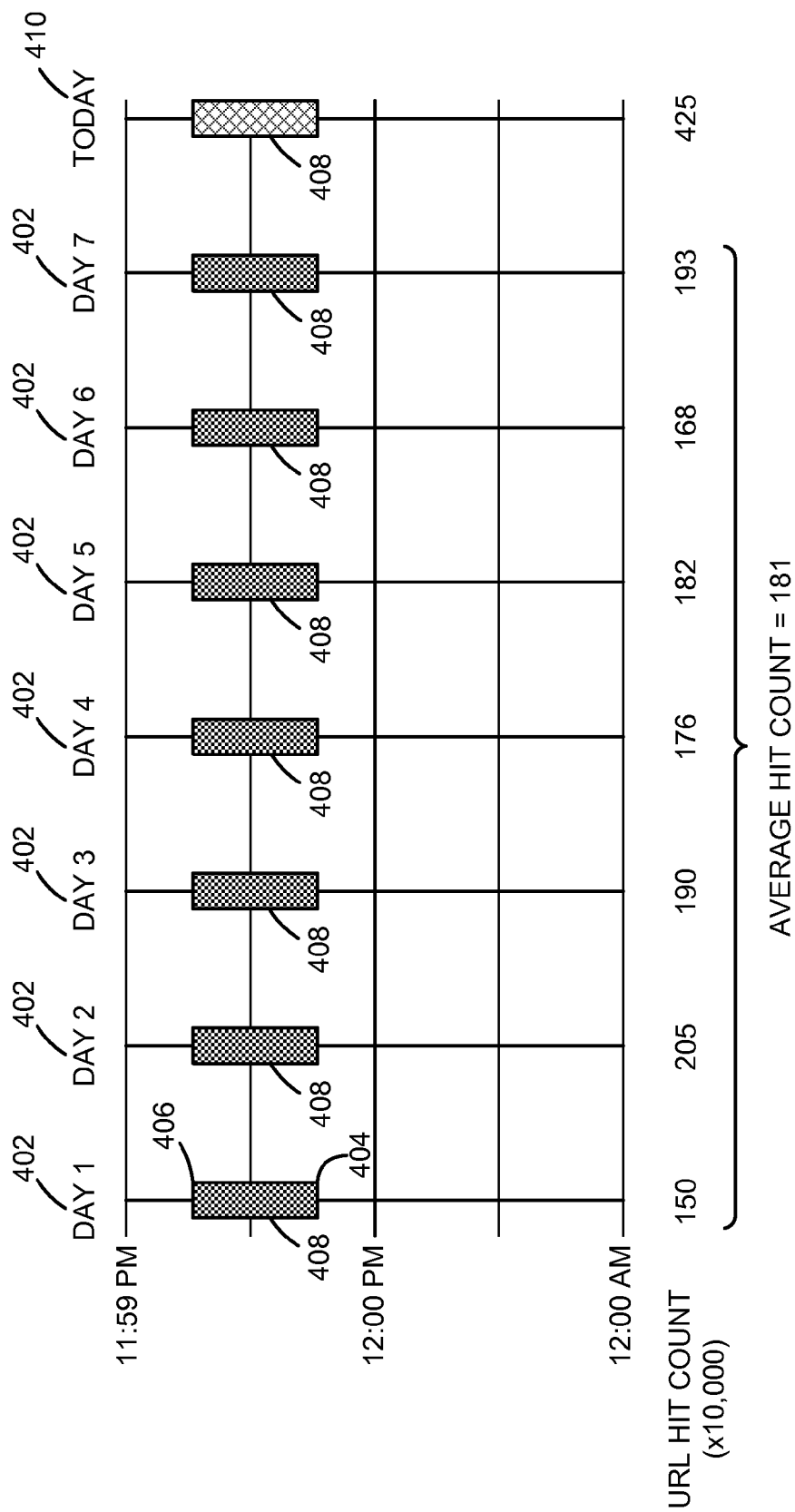
FIG. 4 is a chart depicting hit counts for a URL for the same time period in each of eight days in accordance with an embodiment of the invention.

At a step 304, a number of instances of a specific URL is identified in the history files received from the plurality of users' computing devices. For instance, a specific URL might be included in, for example, 425 history files received from a group of user's computing devices by the search index update server, as depicted in FIG. 4. The number of instances of the specific URL is determined based on the number of received history files that include at least one instance of the specific URL or based on the number of total instances of the specific URL in the received history files, e.g. a single history file may include more than one instance of the specific URL when, for example, a user accesses the URL more than one time.

At a step 306, an average number of instances of the specific URL in the received history files is determined over a number of previous days 402, as depicted in FIG. 4. In an embodiment, the average is determined over the most recent seven days 402. The average might also be determined over the most recent number of days that is an integer multiple of seven, e.g. the most recent fourteen, twenty-one, twenty-eight, etc. days. Using seven or a multiple thereof to determine the average number of instances of the specific URL avoids discrepancies in the determined average due to differences in traffic to the specific URL on weekend days, week days, and other variations between individual days.

The average is also determined based on the same time period within each of the previous days 402, e.g. the average is determined based the number of instances of the specific URL between a given start 404 and stop 406 time each day. For example, as depicted in FIG. 4, the average is determined for instances of the specific URL in a time period 408 between 3:00 PM and 9:00 PM each day. The time period 408 is depicted between 3:00 PM and 9:00 PM herein for exemplary purposes only and is not intended to limit embodiments of the invention to any specific time period. Calculating the average based on the same time period each day may alleviate variance in the average caused by factors such as, for example, and not limitation, URLs that are frequented more/less at different times of the day like a morning news website that has a greater number of hits in morning hours, or a gaming website that might have a greater number of hits in the evening hours.

In an embodiment, the average is determined based only on history files received from a group of user's computing devices that cover the time period. For example, if a group of user's computing devices report history files every six hours and the scheduled reporting times are 3:00 PM and 9:00 PM, then the history files received from this group at 9:00 PM cover the time period 408. In another embodiment, the average is determined based on instances of the specific URL occurring within the time period 408 included in history files received from any and/or all user's computing devices; instances of the specific URL occurring within the time period 408 are used to determine the average without regard to when the respective history files were received or to the overall time period covered by the respective history files. In such an embodiment, metadata indicating a time of day when the specific URL was accessed might also be included in the history file.

With continued reference to FIGS. 3 and 4, the number of instances of the specific URL in the received history files is compared to the average number of instances of the specific URL over the previous number of days 402 and within the time period 408 covered by the received history files, at a step 308. At a step 310, the specific URL is identified as a spiking URL when the number of instances of the specific URL in the received history files is sufficiently greater or is a predetermined amount greater than the average number of instances of the specific URL. In an embodiment, the specific URL is identified as a spiking URL when the number of instances is twice the average number of instances. As depicted in FIG. 4, the specific URL has 425 instances in the received history files received today 410 for the time period between 3:00 PM and 9:00 PM; the average number of instances for the specific URL over that most recent seven days 402 is 181. Thus, the number of instances of the specific URL is greater than twice the average (e.g. 362) and the specific URL is identified as a spiking URL.

At a step 312, a search index is updated to include an indication that the specific URL is a spiking URL. The indication may be employed by a search engine when processing a search query to identify search query results that are most relevant to the search query and/or when determining a ranking of identified search query results. For example, an indication that a URL is spiking might increase the inclusion of the spiking URL in search results even when the spiking URL does not perfectly match with the search query and/or increase the rank of the spiking URL in the search results e.g. move the spiking URL to a more prominent position in the search results as they are presented to a user.

Figure 5:
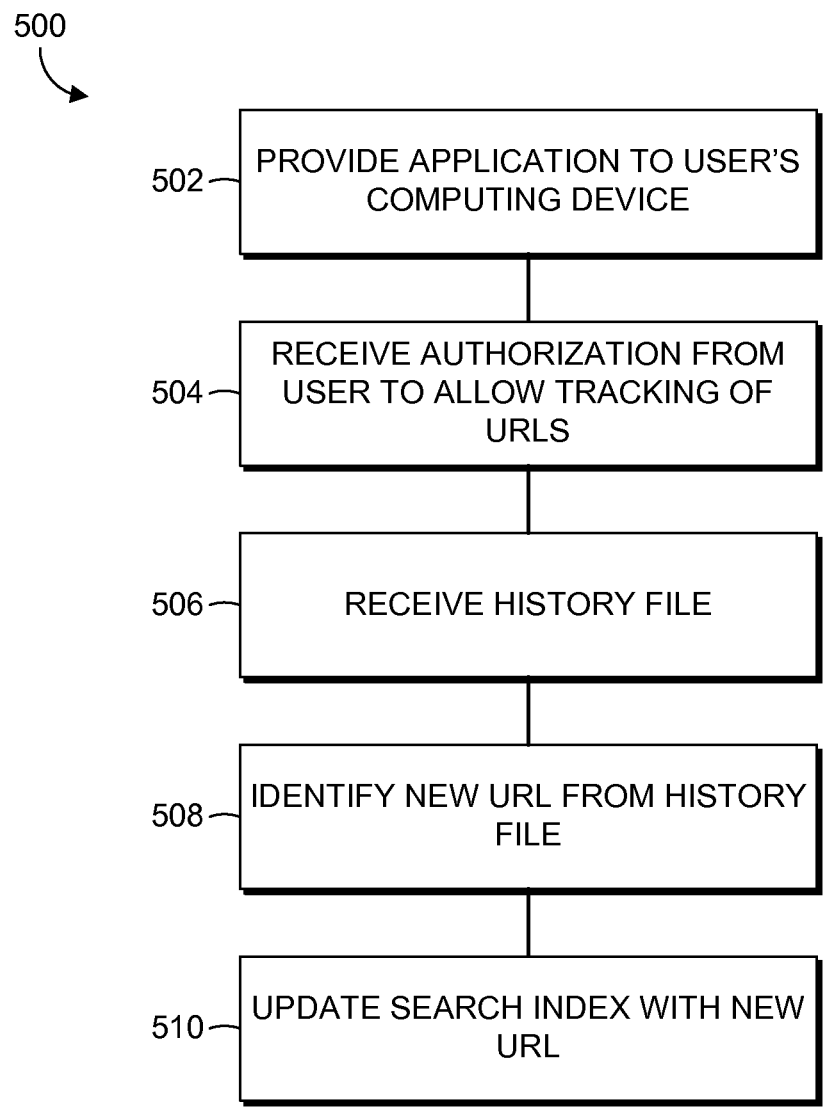
FIGS. 5 and 5A are flow diagrams depicting a method for updating a search index with newly published documents in accordance with an embodiment of the invention.

With reference now to FIG. 5, a method 500 for updating a search index with newly published documents in accordance with an embodiment of the invention is described. At a step 502, an application is provided to a plurality of user's computing devices. The application is configured to generate a history file that includes indications of URLs accessed by a browser application. As described previously above, the application is a browser application or is a plug-in or add-on application for the browser application. In another embodiment, the application is a stand-alone application that monitors activities of a browser application.

At a step 504, authorization is received from a user of a respective computing device to which the application is provided. The authorization allows the application to track URLs accessed by the browser application and authorizes the application to communicate the history file. The authorization may be obtained via a form or by other means known in the art.

The history file is received by a search index update server from a user's computing device at a step 506. The history file is parsed by the server, or one or more applications residing thereon, to identify one or more new URLs, at a step 508. As described previously, a new URL may include a URL that is not included in a search index with which the search index update server is associated or a URL that was not otherwise previously known by the search index update server. At a step 510, a search index is updated to include the new URL.

As described above, in embodiments, history files are received from a plurality of user's computing devices and may be received periodically with respect to a set schedule. As such, based on a single reporting group of user's computing devices from which history files are received every six hours, new URLs can be identified in as little as a few minutes up to as long as five hours and fifty-nine minutes from the time when the new URL was first accessed via a reporting user's computing device. Thus, the search index may be updated to include the new URL in a very short time ranging from minutes to a few hours from the time the new URL was first accessed via the reporting user's computing device.

Expanding this example to include a plurality of reporting groups of user's computing devices that are scheduled to sequentially report history files in thirty minute intervals, e.g. a group A reports history files at 9:00 PM, a group B reports at 9:30 PM, etc., and assuming a large sample size in each group, the time between a new URL being accessed via one of the user's computing devices and the search index being updated with the new URL may be less than thirty minutes. In an embodiment, the sample size is determined such that the probability that at least one of the user's computing devices in the group will access the new URL is sufficiently high. The reporting intervals described above are intended for illustration purposes only and are not intended to limit embodiments of the invention to any specific time periods.

In an embodiment, the search index is updated with the new URL substantially earlier than if the search index was updated based on an RSS feed or similar data file provided by a domain that listed the new URL, updates, and/or changes to websites or documents in the domain. In another embodiment, the search index is updated with the new URL substantially earlier than if the search index was updated based on parsing published documents for URLs contained therein. Further, the search index may be updated with new URLs from domains that were previously unknown to the search index update server and not included in the search index.

Figure 5A:
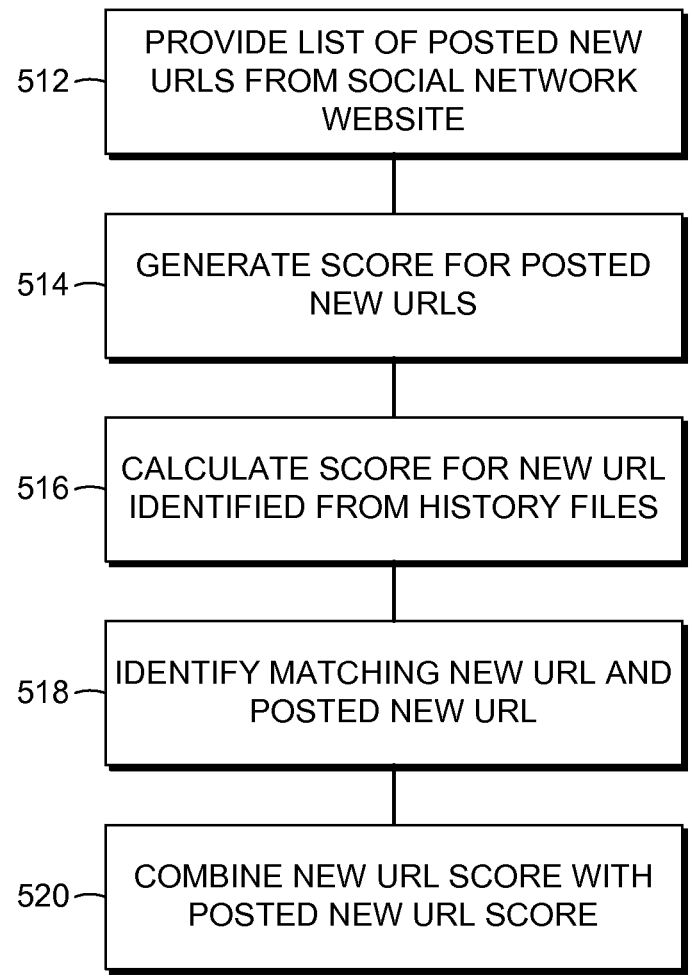

With additional reference to FIG. 5A, data from a social network service is employed as an additional data source to update the search index. At a step 512, a list of new URLs posted on the social network service (hereinafter referred to as posted new URLs) is provided. The list is generated from data obtained from a social network server, such as the social network server 208 discussed above. As described previously, the posted new URLs are identified from posts or other communications of authors on the social network service.

At a step 514, a score is generated for each of the posted new URLs. The score is based at least partially on an author quality rating and a number of authors posting the URL. The author quality rating is determined for one or more of the authors posting to the social network service and is based at least in part on the time when the author posted the URL with respect to other authors that posted the URL and the author's history with respect to posting new URLs.

For example, the first author to post a new URL might receive a maximum rating while authors that subsequently post the posted new URL receive sequentially decreasing ratings. The ratings might decrease exponentially, linearly, or otherwise. The author's ratings might also be tracked or stored to develop a history and or cumulative rating for the author with respect to his or her posting of posted new URLs. As such, the validity of a posted new URL or the likelihood that the posted new URL is a valuable URL might be determined based on the posting author's rating in combination with the number of authors posting the posted new URL. Thus, a posted new URL that is posted by one or more highly rated authors and that is posted by a large number of authors may be determined to be a valuable URL and not spam or other undesirable URL.

A score is also calculated for the new URL identified from the history files received from the user's computing devices, at a step 516. This score is based at least in part on the number of instances of new URL in the history files over a predetermined period of time. Other additional factors and/or characteristics might also be used to calculate the score.

At a step 518, a new posted URL from the social network service that matches a new URL identified from received history files is identified. The scores for the posted new URL and the new URL are combined, at a step 520. As such, the combined score is usable by the search index update server to determine whether to update the search index with the new/posted new URL. The combined score might also be employed to determine rankings, weighting factors, or other characteristics associated with entries in the search index that inform provisioning of search query results by a search engine that utilizes the search index.

Figure 6:
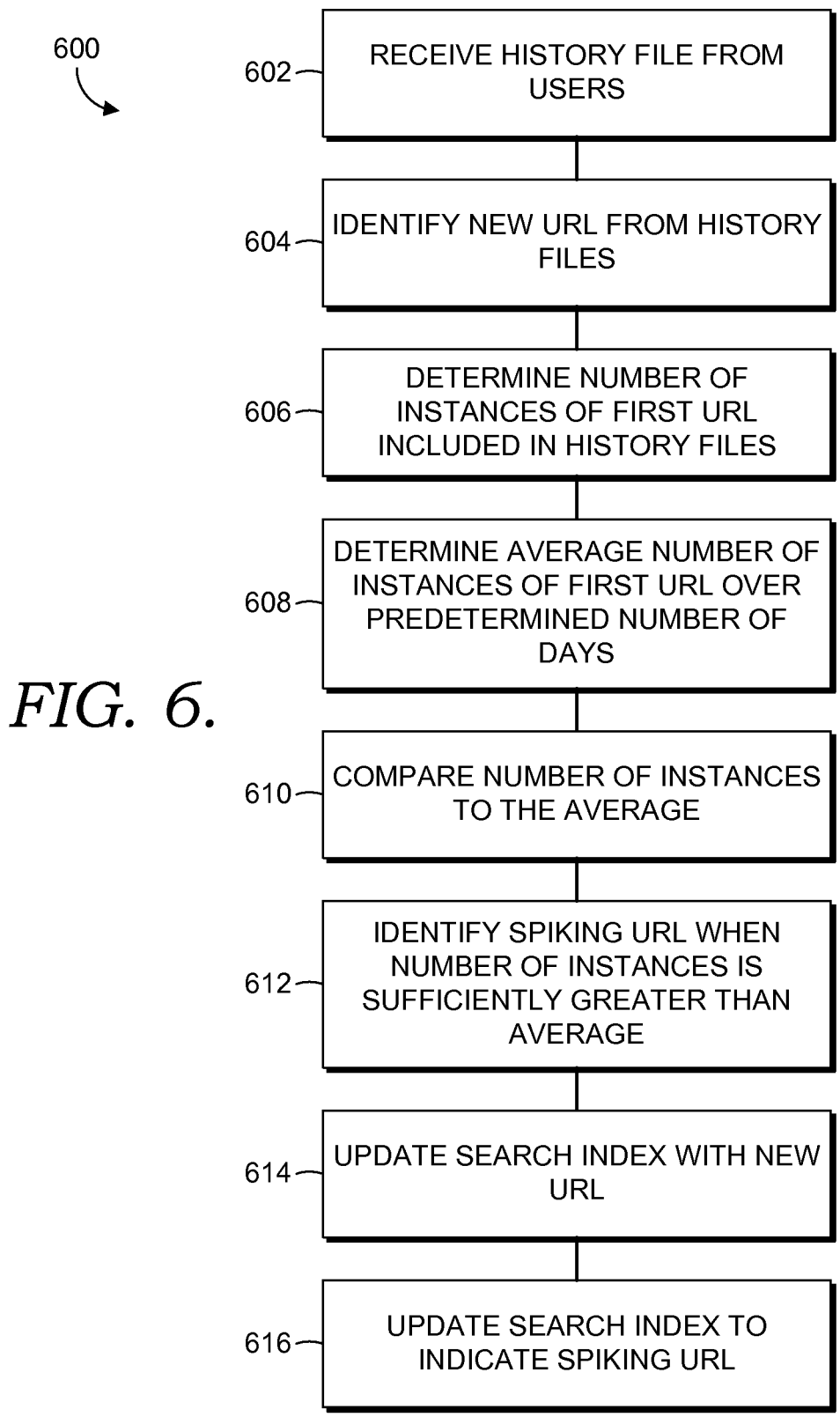
FIGS. 6 and 6A are flow diagrams depicting a method for updating a search index with new and spiking uniform resource locators in accordance with an embodiment of the invention.

Referring now to FIG. 6, a method 600 for updating a search index with new and spiking uniform resource locators in accordance with an embodiment of the invention is described. At a step 602, history files are received from a plurality of user's computing devices at a search index update server. The server identifies one or more new URLs in the history files, at a step 604.

At a step 606, a number of instances of one or more specific URLs in the history files is determined. The one or more specific URLs include the one or more identified new URLs or might not include the new URLs. The number may be determined from a single set of history files that are fully inclusive of a given time period or from a number of sets of history files that include instances within the given time period. At a step 608, an average number of instances of each of the specific URLs is determined for the given time period over a predetermined number of days. In an embodiment, the predetermined number of days is seven. The number of instances of each of the specific URLs in the history files is compared with their respective averages, at a step 610. Specific URLs that exhibit a number of instances that is sufficiently greater than their respective average are identified as spiking URLs, e.g. URLs with increased user interest, at a step 612.

A search index is updated by the search index update server to include the new URL(s) and to include an indication of the spiking URL(s), at steps 614 and 616 respectively. As such, the search index is updated very quickly with respect to a time when a new URL is first accessed by a user via a user's computing device from which a history file is received. Additionally, the search index is also updated in a timely fashion, e.g. within a day or less, to include indications that one or more specific URLs have an increased user interest and thus is likely more readily provided as a search query result and/or is given greater weight when ranking search query results.

Figure 6A:
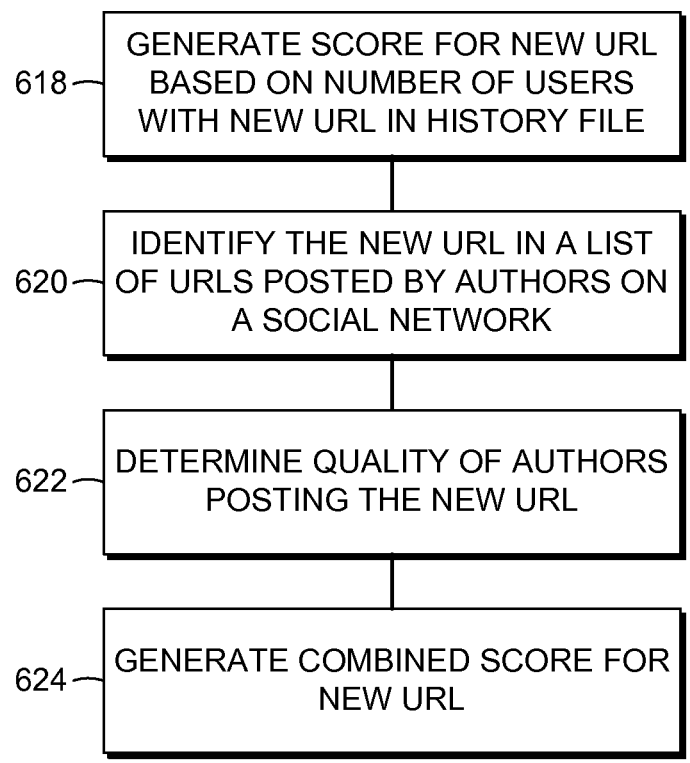

With additional reference to FIG. 6A, a score is generated for each of the one or more new URLs identified from the history files, at a step 618. One or more of the new URLs are identified in a list of URLs posted by authors on a social network service, at a step 620. A quality of the authors posting the new URLs is determined, at a step 622. The quality of each of the authors is determined based at least in part on a time the author posted the URL on the social network service with respect to other authors that posted the URL and the author's history of posting new URLs to the social network service. In an embodiment, the author's quality is determined as a numerical rating.

At a step 624, a combined score is generated for each of the new URLs by combining the score generated for the new URL with the author's quality ratings for the authors that posted the new URL to the social network service. Combining the score with the quality ratings may incorporate any desired algorithms, calculations, or the like. The combined score is usable by the search index update server to determine whether the new URL(s) should be added to a search index.

A URL might not be added to the search index when the score indicates that the new URL is of little or marginal value or interest to users. Such might be the case when the new URL is associated with spam or unwanted advertisement content. In an embodiment, the search index update server is associated with a fresh index and a general index as described previously. In such an embodiment, the search index update server might employ the combined score to determine whether to update the fresh index to include the new URL but, may include the new URL in the general index without respect to the combined score. In another embodiment, the search index update server updates the fresh index and the general index to include all new URLs and employs the score and and/or combined score to inform ranking and weighting of the new URL in the indexes and/or in search query results generated therefrom.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

We claim:

1. A computer-implemented method for updating a search index to identify documents with spiking interest, the method comprising:

periodically receiving, at a first computing device having a processor and a memory, a history file from each of a plurality of second computing devices, the history file including a uniform resource identifier (URI) that has been accessed via a respective one of the plurality of second computing devices and metadata indicating a time of day when the URIs were accessed, wherein the plurality of second computing devices form a group of second computing devices;

determining a number of instances of the URI in the history files for the group of second computing devices, wherein the number of instances occurs in a predetermined time period between a given start and stop time;

calculating, automatically without user interaction, an average number of instances of the URI in the history files for the group of second computing devices, wherein the average number of instances occurs in the predetermined time period over a predetermined number of previous days, and wherein the predetermined time period is between the given start and stop time each day;

determining that the number of instances of the URI in the history file is at least a predetermined amount greater than the average number of instances of the URI in the history files by, automatically without user interaction, comparing the number of instances of the URI for the group of second computing devices to the average number of instances of the URI over the predetermined number of days for said group of second computing devices;

identifying the URI as a spiking URI when the number of instances of the URI is at least a predetermined amount greater than the average number of instances of the URI occurring over the predetermined number of days; and updating a search index to indicate the spiking URI, the search index being useable by a search engine to identify search results for a search query.

2. The method of claim 1, wherein the predetermined number of days is seven or an integer multiple of seven.

3. The method of claim 1, wherein the predetermined amount is greater than twice the average number of instances of the URI over the predetermined number of days.

4. The method of claim 1, wherein each of the second computing devices includes a browser application that generates the history file and communicates the history file to the first computing device.

5. The method of claim 4, wherein a user authorizes the browser application to track URIs accessed via the respective one of the plurality of second computing devices.

6. The method of claim 1, wherein a score is generated for the spiking URI based at least in part on the comparing of the number of instances of the URI to the average number of instances of the URI over the predetermined number of days.

7. The method of claim 6, wherein the search index is a fresh index that is periodically updated in intervals of less than one hour and the score is used to aid in ranking URIs in fresh index.

8. One or more computer-readable media having computer-executable instructions embodied thereon that, when executed, perform a method for updating a search index with new and spiking uniform resource identifiers (URIs), the method comprising:

periodically receiving, at a first computing device having a processor and a memory, a history file from each of a plurality of second computing devices, the history file including one or more URIs that have been accessed via a respective one of the plurality of second computing devices and metadata indicating a time of day when the URIs were accessed, wherein the history file is a file including one or more URIs, and wherein the plurality of second computing devices form a group of second computing devices;

identifying, by the first computing device, a first new URI from one or more of the history files for the group of second computing devices, the first new URI associated with a document that was previously unknown to the first computing device;

determining a number of instances of a second URI of the one or more URIs included in the history files for the group of second computing devices which were accessed within a predetermined time period between a given start and stop time;

determining an average number of instances of the second URI in the history files for the group of second computing devices accessed in the predetermined time period over a predetermined number of days, wherein the predetermined time period is between the given start and stop time each day;

determining that the number of instances of the second of the one or more URI included in the history file is at least a predetermined amount greater than the average number of instances of the second URI in the history files by, automatically without user interaction, comparing the number of instances of the second URI to the average number of instances of the second URI over the predetermined number of days for said group of second computing devices;

identifying the second URI as a spiking URI when the number of instances of the second URI is at least a predetermined amount greater than the average number of instances of the second URI over the predetermined number of days;

updating the search index with the first new URI; and updating the search index to indicate the spiking URI, the search index being useable by a search engine to identify search results for a search query.

9. The computer-readable media of claim 8, further comprising:

generating a first score for the first new URI based at least partially on a number of the second computing devices from the plurality of second computing devices that include an indication of the first new URI in a respective history file; and determining whether to update the search index with the first new URI based on the first score.

10. The computer-readable media of claim 9, further comprising:

identifying a third new URI from a list of URIs posted by authors on a social networking website, the third new URI not being previously included in the search index, and the third new URI being the same or different than the first new URL;

determining a quality of an author that posted the third new URI on the social networking website, wherein the quality of the author is based at least on a time that the author posted the third new URI and the author's history of posting URIs that have not been previously included in the search index;

generating a second score for the third new URI based at least in part on the quality of the author.

11. The computer-readable media of claim 10, wherein determining whether to update the search index with the first new URI based on the first score is also based on the second score when the first new URI and the third new URI are the same.

12. The computer-readable media of claim 8, wherein the search index is updated with the first new URI within thirty minutes of identifying the first new URI.

13. The computer-readable media of claim 8, wherein the first new URI and the second URI are the same.

* * * * *